No. 799,023. PATENTED SEPT. 5, 1905.
J. WILKINSON.
ELASTIC FLUID TURBINE.
APPLICATION FILED JULY 3, 1905.
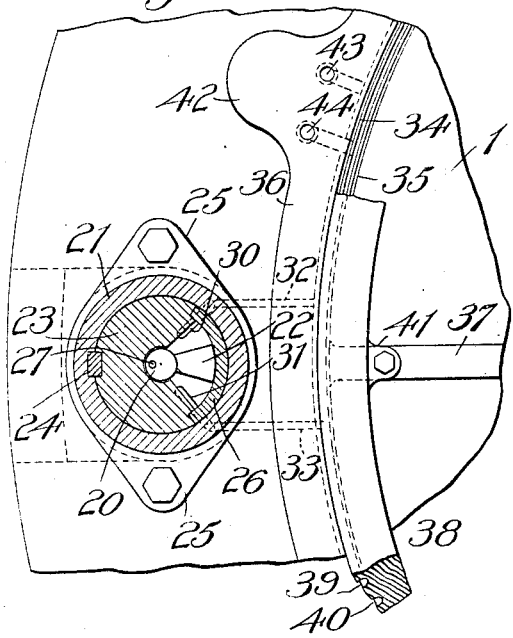
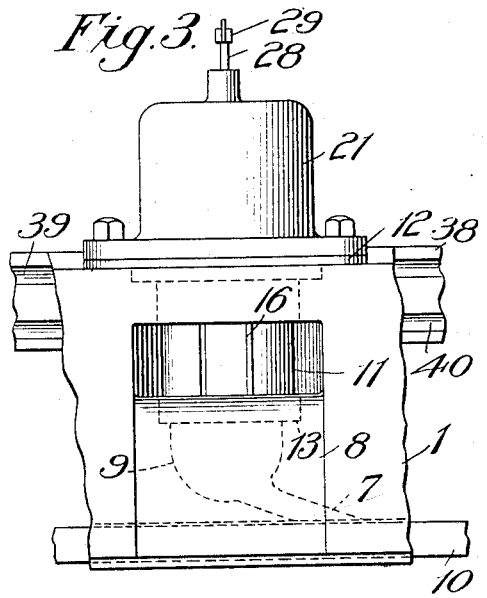
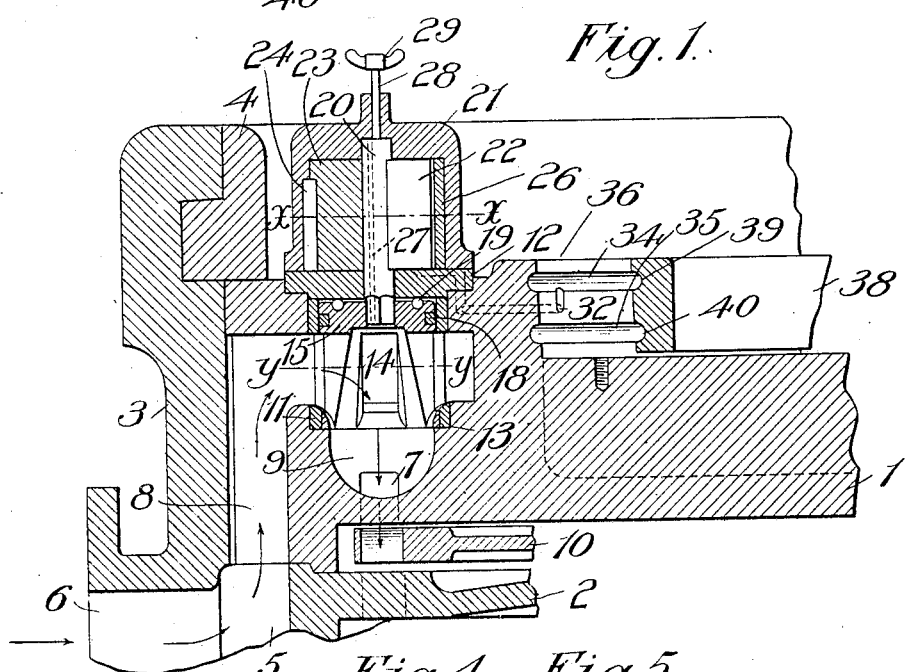
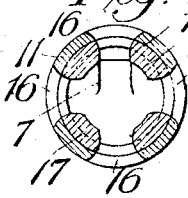
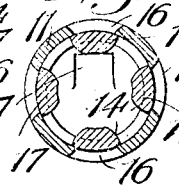
WITNESSES:
Edwin L. Bradford
P. H. Burch
INVENTOR
James Wilkinson
BY
ATTORNEY

UNITED STATES PATENT OFFICE.

JAMES WILKINSON, OF PROVIDENCE, RHODE ISLAND.

ELASTIC-FLUID TURBINE.

No. 799,023.　　　　　Specification of Letters Patent.　　　　　Patented Sept. 5, 1905.

Application filed July 3, 1905. Serial No. 268,204.

*To all whom it may concern:*

Be it known that I, JAMES WILKINSON, a citizen of the United States, residing at Providence, in the county of Providence and State of Rhode Island, have invented new and useful Improvements in Elastic-Fluid Turbines, of which the following is a specification.

My invention relates to valve mechanism particularly adapted for use in turbines and rotary motors, and comprises improvements in the construction of the valves and fluid-pressure motors for operating them.

It is an object of my invention to provide an improved balanced semirotary valve, which is preferably disposed over the bowl of a nozzle to control the supply of fluid thereto. In the construction illustrated the valve will be disposed axially of the turbine and of the fluid stream delivered by it to a nozzle and provided with means for operating it carried by the supply-head of the turbine. As this latter arrangement is of particular advantage only when an outer shell or casing surrounds the turbine, and thereby interferes with the connection at the side of the turbine of external operating devices for the turbine-valves, the disposition of the valves and motors may be changed at will for other turbine constructions.

It is a further object to improve the construction and arrangement of fluid-motors for operating rotary turbine-valves in which wing-pistons disposed in suitable cylinders are connected to the valves and operated by fluid-pressure admitted to the cylinders by fluid-conduits leading from a fluid-pressure-controller means.

It is a further object to provide novel means for the formation of the controller-fluid conduits. A preferred manner of forming these conduits is to provide the supply-head with an annular shoulder having semicircular grooves in its face with which similar grooves in the face of a detachable ring register. The ring may be integral or segmental and may be ground to a steam-tight fit to prevent the leakage of the controller-fluid pressure from the conduits formed by the grooves. The channels may be formed at any other point in the supply-head, and, if desired, only the shoulder or ring need be grooved, thereby producing semicircular conduits. Any fluid-pressure-controller mechanism may be used to regulate the pressure in the conduits, and thereby control the operation of the turbine-valves.

My invention further comprises the details of construction and arrangement of parts illustrated in the accompanying drawings in a preferred form and more fully hereinafter described.

Referring to the drawings, Figure 1 is a partial vertical sectional view through portions of a turbine provided with my improved valve and motor shown in vertical cross-section. Fig. 2 is a partial plan view of Fig. 1, showing the valve-motor in horizontal section along the line $x$ $x$, Fig. 1. Fig. 3 is a side view of the supply-head with the outer shell removed. Figs. 4 and 5 are sectional views along the line $y$ $y$, Fig. 1, illustrating the semirotary valve in open and closed positions.

Similar reference-numerals refer to similar parts throughout the drawings.

I have shown my invention as applied to a turbine, such as is more fully illustrated and described in my Letters Patent No. 766,921, though it is to be understood that the novel features are claimed without limitation to any particular turbine or motor. In the drawings I have illustrated only those parts of the turbine to which my invention is applied, which may be briefly described as comprising a supply-head 1 and any desired number of diaphragms 2, which subdivide the interior of the turbine into stages and which are provided with peripheral interlocking flanges forming the inner casing. A shell 3 surrounds the inner casing and holds the parts thereof together by means of abutments engaging the turbine-heads, one being shown as a detachable locking-ring 4. A steam-jacket chamber 5 is provided between the shell and casing to which the motor-fluid supply of the turbine is introduced through a port 6. The motor fluid flows from the chamber 5 to any desired number of nozzles 7, through passages 8, leading at right angles through the head 1 and discharging into the bowls 9 of the nozzles. The nozzles discharge the motor fluid against the impact-surfaces of the bucket-wheel 10, one of which is disposed within each stage. I have shown only one supply passage, nozzle, and bowl, as the others will be similar in design and their disclosure would constitute a mere duplication of parts.

The ends of the supply-passages 8, disposed above the nozzle-bowls 9, are circular in form and adapted to receive a grated valve shell or casing 11, inserted through a circular opening in the head 1. This opening is closed by a plug 12, forming a head for the motor-cylinder hereinafter described, which is bolted or otherwise secured to the head and by engaging the shell 11 holds the latter firmly in position. The upper portion of the nozzle-bowl is cut away at 13 to form a seat for the inner end of the shell 11 and also for the semirotary valve 14. This valve is formed with a circular head 15, disposed within the upper portion of the shell 11 above the ports 16 therein, through which the fluid-pressure flows into the nozzle-bowl. As shown, the shell is provided with four of these ports 16, and the valve 14 has four webs 17 formed integral with the head 15 and with circular inner end of the valve. In other words, the valve is a cylindrical multiported valve open at its inner end and disposed in a multiported valve-casing, also cylindrical, both of which parts are inserted into the nozzle-bearing portion of the turbine, the inner end of the valve opening into a bowl or enlarged supply-passage for a nozzle.

It will be noted that the webs 17 of the valve taper in thickness from the valve-head 15 to the integral bottom ring of the valve. A packing-ring 18 is inserted between the valve-head 15 and the casing to prevent the leakage of pressure between these parts when the valve is closed. To take up the thrust of the valve against plug 12 and reduce the friction and power necessary to move the valve, a set of antifriction-balls 19 are disposed between the head and plug 12 in an annular raceway formed in the head. At its center the head is formed with a squared opening to receive the squared end of a stem 20, which is rounded where it passes through the plug 12.

The plug 12 forms the inner head of a motor-cylinder 21, through which the stem 20 passes and within which a wing-piston 22, rigidly connected to the stem 20, is disposed and by means of which the stem is rocked in circular bearings formed in cylinder-heads. The cylinder is formed as an integral shell or casing open at its inner end to receive a segmental abutment 23, held against rotation in the cylinder by a key 24, inserted in grooves formed in the cylinder and abutment. The cylinders are adapted to be set over the openings through which the valves are inserted into the turbine-head and are provided with side flanges 25, by means of which they are securely bolted to the head. The segmental abutment is held firmly in place within the cylinder by means of the key and a curved spreader-plate 26, which is adapted to be inserted into the cylinder to keep the abutment spread open hard. The wing-piston 22 is in the form of a segment, its length corresponding with the radial distance from the stem to the inner face of the spreader-ring 26. The travel of this piston between the sides of the abutment 23 is sufficient to rotate the valve about forty-five degrees, which will move it to fully open the ports in the valve-casing or to close them with proper lap. A passage 27 leads longitudinally through the stem 20 to admit pressure at opposite ends and balance it. A stem 28, connected to the wing-piston stem, projects through a suitable opening in the outer head of the cylinder and has a wing-nut 29 connected thereto. This wing-nut moves with the valve and serves the double purpose of indicating the latter's position and also of enabling it to be moved open or closed by hand.

Cylinder-head 12 is provided with two ports 30 and 31 for the admission of controller fluid-pressure to opposite sides of the piston 22. These ports are formed by radial grooves in the upper face of the head 12, which are closed above at their outer ends by the cylinder-casing and which communicate with passages 32 and 33, respectively, which lead at right angles through the head and open into semicircular grooves or channels 34 and 35, formed in the inner face of a shouldered portion 36 of the head. A plurality of radial strengthening-webs 37 lead inwardly from this shouldered portion of the head 1 to the shaft-opening therein. A channeled ring 38, provided with peripheral grooves 39 and 40, engages the channeled face of the shoulder 36, the grooves 34 39 and 35 40 registering and forming conduits through which the pressure flows to the several valve-motors around the turbine. This ring is formed with lips 41, by means of which it is bolted to the tops of webs 37, the ring being segmental or integral, as may be desired; also, where there is no occasion for the fluid-controller conduits to extend around the turbine-head any desired length of segment of the ring may be used. I have shown the head provided with a portion 42, adapted to receive fluid-pressure-governing devices (not shown) by means of which pressure is raised or lowered in the passages 43 and 44, which lead at right angles through the shoulder and communicate, respectively, with the conduits 34 and 35. The controller or governing devices may be such as shown and described in a number of patents heretofore issued to me.

As the fluid-pressure enters the chamber 5 it flows upwardly through the passages 8, which are preferably formed by coring a channel or groove in the outer periphery of the head, as shown in Fig. 3, which is covered by the casing 3. The fluid then enters the enlarged circular end of the passage 8, in which it surrounds the multiported valve-casing 11 on all sides, so as to balance the same laterally. When the valve is moved so as to open the ports 16 in the casing, the motor fluid rushes down through these ports and through the open end of the valve into the nozzle-bowl 9, from which it is discharged through the nozzle 7 against the bucket-wheel. The pressure existing in the valve and nozzle-bowl has access above the valve-head 15, through the opening around the stem 20, which is squared at its end and is a loose fit in the squared hole in the valve-head, thereby practically balancing the valve endwise except for such pressure as may be caused by the reaction of the moving fluid. Any slight unbalancing of the valve in this direction will be taken care of by the antifriction-balls 19. The engagement of the stem 20 with the valve-head causes the valve to be rotated to its open or closed position, according as the wing-piston 22 is shifted by the pressures admitted to opposite sides thereof through the ports 30 and 31. This pressure being determined by the controller mechanism, it follows that if the pressure be exhausted from one side of the piston and high pressure admitted against the other it will be moved positively and quickly to effect a full opening or closing movement of the valve. On the other hand, if the pressures be only slightly unbalanced the valve may be caused to assume intermediate positions in the manner described in applications now pending. Since any leakage of pressure from the motor around stem 20 will enter the nozzle through the opening in valve-head 15, the steam need not be packed, though this may be done, if desired. The escape of the controller fluid between the conduit-ring 38 and the grooved shoulder 36 may be prevented by the use of packing, or, as stated, the ring may be ground to a steam-tight fit in any desired manner. A greater number of conduits may be provided between the ring and shoulder when desired for controlling the several valves independently, and they may be formed by channels in either ring or shoulder, or, as shown, in both.

Having in this manner described an illustrative embodiment of my invention, I desire to claim the points of novelty therein both separately and in combination and without limitation to the details of construction, which may be modified without the exercise of inventive ingenuity.

What I do claim is—

1. In a turbine, a nozzle formed in a stationary element, a bowl for the nozzle, and a rotary valve disposed above the bowl and adapted to control the supply of motor fluid thereto.

2. In a turbine, a supply-head for a wheel-compartment, a nozzle and bowl therein, and a rotary valve seated in the head above said bowl and adapted to control the supply of motor fluid thereto.

3. In a turbine, a supply-head for a wheel-compartment, a nozzle and bowl therein, a fluid-supply passage for said bowl, a rotary valve and a seat therefor disposed in said passage and adapted to cut said nozzle into and out of service.

4. In a turbine, a stationary element, a nozzle-passage therein, a bowl for said nozzle, a hollow rotary valve disposed above said bowl, a casing for said valve, and a motor-fluid-supply passage surrounding said valve and casing and having communication therethrough with said bowl.

5. In a turbine, a stationary element, a nozzle-passage therein, a bowl for said nozzle, a multiported rotary valve disposed above said bowl, a multiported valve-casing, and means to admit the motor-fluid pressure around said casing.

6. In a turbine, a supply-head for a wheel-compartment, a fluid-supply passage therein, a hollow cylindrical multiported valve-casing inserted in said head transversely of said passage, a nozzle-passage leading from an end of said casing through said head, and a multiported semirotary valve in said casing.

7. In a turbine, a supply-head, a nozzle-passage therein, a fluid-supply passage, a valve-casing disposed across said passage, ports in said casing open to said passage, said casing at its inner end being disposed over said nozzle-passage, a rotary valve in said casing, and means to operate the valve to control the supply of fluid to said nozzle.

8. In a turbine, a supply-head having a nozzle and a fluid-supply passage therein, a multiported valve-casing inserted into said head and disposed across said passage with its inner end over said nozzle's supply end, a rotary valve disposed in said casing and provided with ports through which the fluid flows to said nozzle, and a fluid-pressure-oscillated piston for rotating said valve.

9. In a turbine, a nozzle-passage in a stationary element, a semirotary controller-valve therefor disposed end to end with the supply end of said passage, and one or more fluid-pressure-admission ports adapted to be opened or closed by said valve.

10. In a turbine, a nozzle, a fluid-pressure-supply passage therefor, a rotary valve disposed in said passage with its fluid-discharging end toward the admission end of said nozzle, and means to move said valve to open and close communication between said passage and nozzle.

11. In a turbine, a nozzle, a fluid-pressure-supply passage therefor, a valve-casing disposed in said passage and having one end over the admission end of said nozzle, a rotary valve in said casing to control the flow of fluid-pressure therethrough into said nozzle, means to admit the pressure below the valve into the upper end of the casing, and packing to prevent the fluid-pressure in said passage gaining access to the upper end of said casing when the valve is closed.

12. In a turbine, a nozzle, a rotatable bucket element driven by fluid-pressure discharged from said nozzle, a rotary valve substantially surrounded by the motor-fluid pressure and radially balanced in all of its operating positions, and a fluid-supply port for the nozzle which is opened or closed by said valve.

13. In a turbine, a nozzle-passage, a rotatable bucket element driven by fluid-pressure flowing through said passage, a rotary valve movable on an axis substantially in line with the supply end of said passage, a valve-casing in a fluid-pressure-supply passage, a port or ports in said casing controlled by said valve, and an operating-stem for said valve projecting without said casing and fluid-passage.

14. In a turbine, a stationary element, a nozzle therein, a valve-casing inserted in said element, an oscillatory fluid-motor, and a rotary balanced valve seated in said casing and operatively connected to said motor, said valve controlling the supply of motor fluid to a nozzle.

15. In a turbine, a stationary element, a nozzle-passage therein, a valve-casing inserted in said element so that an open end thereof surrounds the supply end of said nozzle-passage, a rotary valve seated in said casing, a cylinder, a wing-piston therein operatively connected to said valve by a stem passing through the cylinder-head, and means to supply fluid-pressure under control to said cylinder to operate said valve.

16. In a turbine, a valve-motor comprising a cylinder formed in an element connected to said turbine, an abutment secured therein, a wing-piston disposed in said cylinder and having a stem, and a rotary valve connected to said stem and moved thereby to control a supply of fluid-pressure to the turbine.

17. In a turbine, a valve-motor, a stationary element carrying a nozzle, and a valve for controlling said nozzle, said motor comprising a cylinder, an abutment keyed therein, a spreader-plate for said abutment, and a wing-piston actuated by fluid-pressure and connected to said valve.

18. A turbine valve-motor comprising a cylinder formed in a detachable element, a segment-shaped abutment inserted therein, means to hold said abutment stationary in said cylinder, a wing-piston mounted in said cylinder, a valve operated by said piston, and a controller-fluid-pressure port or ports for said cylinder.

19. In a turbine, a stationary element provided with a nozzle, a rotary valve therefor inserted into said element, a motor for said valve disposed above the opening in said element through which said valve was inserted, a wing-piston in said motor which operates a stem connected to said valve, and a longitudinal passage in said stem to equalize pressures at its ends to balance it.

20. In combination, a cylinder connected to a nozzle-bearing portion of a turbine, a wing-piston in said cylinder, a stem, carrying said piston and movable thereby, which projects through a cylinder-head into said nozzle-bearing portion, a rotary valve in said portion having a hollow body and a head which said stem engages, passages to equalize the pressures above and below said valve and stem to balance them, and a pressure-supply port for said nozzle which is opened and closed by said valve.

21. A turbine supply-head, channels formed therein, a detachable element connected to said head and closing said channels to form controller-fluid conduits in said head, and passages connecting said conduits with a source of controller-fluid pressure and means for operating a turbine-valve.

22. In a turbine, a supply-head having a shouldered portion near its periphery, a valve-motor carried by said head, channels in the inner face of said shouldered portion, a correspondingly-channeled element connected to said channeled shoulder, the channels in said parts registering and forming conduits for the transmission of controller fluid to valve-actuating means.

23. A turbine supply-head having a peripheral shoulder, a detachable ring held in engagement therewith, conduits formed between said shoulder and ring, and means to transmit controller-fluid pressure from said conduits to valve-operating devices.

24. A turbine having a wheel, a nozzle-passage for delivering fluid to the wheel, and a semirotary valve disposed in axial alinement to the fluid stream entering the nozzle.

25. In a turbine, wheel-buckets, a nozzle for delivering motor fluid to the buckets, a semirotary valve having a plurality of side entrances and an end exit for the motor fluid passing to the nozzle.

26. In a turbine, wheel-buckets for delivering motor fluid to the buckets, a semirotary valve having a side entrance and an end exit for the motor fluid, antifriction devices to compensate the axial end thrust of said valve, and means to operate said valve.

27. In a turbine, wheel-buckets, a nozzle for delivering motor fluid to the buckets, a semirotary valve disposed in axial alinement to the fluid stream entering the nozzle, and antifriction means to take up the axial end thrust on said valve.

In testimony whereof I have hereunto set my hand in presence of two subscribing witnesses.

JAMES WILKINSON.

Witnesses:
CLIFFORD E. HUNT,
JAMES H. NOLAN.